United States Patent
McNamee et al.

(10) Patent No.: US 8,635,697 B2
(45) Date of Patent: Jan. 21, 2014

(54) METHOD AND SYSTEM FOR OPERATING SYSTEM IDENTIFICATION IN A NETWORK BASED SECURITY MONITORING SOLUTION

(75) Inventors: Kevin McNamee, Ottawa (CA); Mike Pelley, Ottawa (CA); Darren Deridder, Ottawa (CA); Paul Edwards, Ottawa (CA)

(73) Assignee: Alcatel Lucent, Paris (FR)

( * ) Notice: Subject to any disclaimer, the term of this patent is extended or adjusted under 35 U.S.C. 154(b) by 209 days.

(21) Appl. No.: 13/083,501

(22) Filed: Apr. 8, 2011

(65) Prior Publication Data

US 2012/0255019 A1 Oct. 4, 2012

Related U.S. Application Data

(60) Provisional application No. 61/469,024, filed on Mar. 29, 2011.

(51) Int. Cl.
G06F 11/00 (2006.01)
G06F 12/14 (2006.01)
G06F 12/16 (2006.01)

(52) U.S. Cl.
USPC .......................................... 726/24; 709/224

(58) Field of Classification Search
USPC .............. 726/1, 25, 12, 24, 23; 709/223, 224; 370/252
See application file for complete search history.

(56) References Cited

U.S. PATENT DOCUMENTS

| | | | | |
|---|---|---|---|---|
| 7,317,693 B1 * | 1/2008 | Roesch et al. | ................ | 370/252 |
| 7,627,898 B2 * | 12/2009 | Beck et al. | ...................... | 726/23 |
| 8,020,211 B2 * | 9/2011 | Keanini et al. | .................. | 726/25 |
| 8,065,712 B1 * | 11/2011 | Cheng et al. | ...................... | 726/1 |
| 8,429,746 B2 * | 4/2013 | Capalik | ........................... | 726/23 |
| 2007/0250930 A1 * | 10/2007 | Aziz et al. | ........................ | 726/24 |
| 2008/0282338 A1 * | 11/2008 | Beer | ................................ | 726/12 |
| 2011/0004935 A1 * | 1/2011 | Moffie et al. | ..................... | 726/23 |
| 2011/0213869 A1 * | 9/2011 | Korsunsky et al. | ............ | 709/223 |
| 2012/0204266 A1 * | 8/2012 | Yoo | ................................ | 726/24 |

* cited by examiner

*Primary Examiner* — Dustin Nguyen
(74) *Attorney, Agent, or Firm* — Osha Liang, L.L.P.

(57) ABSTRACT

A method and system for providing network based malware detection in a service provider network is disclosed. Transmission control protocol (TCP) packets defining originating from an access device coupled to the service provider network defining a TCP session between a computing device coupled to the access device, and a destination coupled to the service provider network are received. An operating system identifier (OS ID) associated with the TCP session and the computing device is determined. If malware is present in the TCP session and an associated malware ID is determined by comparing a malware signature to the one or more TCP packets. An alert identifying a network address associated with the access device, the malware ID and the OS ID associated with TCP session that generated the alert can then be generated.

25 Claims, 8 Drawing Sheets

METHOD AND SYSTEM FOR OPERATING SYSTEM IDENTIFICATION IN A NETWORK BASED SECURITY MONITORING SOLUTION

CROSS-REFERENCE TO RELATED APPLICATIONS

This application claims benefit of U.S. Provisional Patent Application No. 61/469,024, filed on Mar. 29, 2011 and entitled "Method and System for Operating System Identification in a Network Based Security Monitoring Solution", in the names of the same inventors as the present application.

TECHNICAL FIELD

The present disclosure relates to identification of computers coupled to a service provider network and in particular to identifying computers infected with malicious software (a.k.a. malware) from session traffic associated with the computers.

BACKGROUND

Residential and business networks LANs are typically connected to the Internet using a gateway or router that uses network address translation (NAT). The NAT device maps local area network (LAN) addresses of multiple devices to a single WAN IP address enabling multiple devices to access the internet using WAN address. All traffic emerging from that network will share the same IP address that is assigned to the gateway or router and Internet service providers typically only provide one wide area network (WAN) address to a modem or connection device at the premises. The NAT device modifies network address information in datagram (IP) packet headers while in transit across a traffic routing device for the purpose of remapping one IP address space into another. From the WAN perspective it is difficult to determine which device behind a NAT device, is originating a particular stream of traffic. This is a particular problem when network based virus or malware detection is utilized where the WAN IP traffic is analyzed to determine the presence of potential malware originating from the LAN. The inability to determine a specific device means that any remediation procedures can not be applied in a focused manner.

Accordingly, systems and methods for Identifying computers behind a Network Address Translaton (NAT) device remains highly desirable.

SUMMARY OF INVENTION

In accordance with an aspect of the present disclosure there is provided a method of network based malware detection in a service provider network. The method comprising receiving one or more transmission control protocol (TCP) packets originating from an access device coupled to the service provider network. The one or more TCP packets defining a TCP session between a computing device coupled to the access device, and a destination coupled to the service provider network; determining an operating system identifier (OS ID) associated with the TCP session and the computing device. If malware is present in the TCP session an associated malware ID is determined by comparing a malware signature to the one or more TCP packets, an alert identifying a network address associated with the access device is generated with the malware ID and the OS ID associated with TCP session that generated the alert.

In accordance with another aspect of the present disclosure there is provided a system for network based malware detection in a service provider network. The system comprising a network sensor coupled to the service provider network. The network sensor receives one or more transmission control protocol (TCP) packets originating from an access device coupled to the service provider network. The one or more TCP packets defining a TCP session between a computing device coupled to the access device, and a destination coupled to the service provider network and determines an operating system identifier (OS ID) associated with the TCP session and the computing device associated and then determines if malware is present in the TCP session and an associated malware ID by comparing a malware signature to the one or more TCP packets. An alert is generated identifying a network address associated with the access device, the malware ID and the OS ID associated with TCP session that generated the alert. A remediation portal is coupled to the service provider network, the remediation portal identifies a subscriber accessing the remediation portal and identifies the OS associated with the computing device used by the subscriber to access the remediation portal. The portal compares the OS associated with the computing device to the OS ID identified in the alert and provides malware remediation to the computing device.

In accordance with yet another aspect of the present disclosure there is provided a computer readable memory containing instructions for network based malware detection in a service provider network. The instructions when executed by a processor performing receiving one or more transmission control protocol (TCP) packets originating from an access device coupled to the service provider network. The one or more TCP packets defining a TCP session between a computing device coupled to the access device, and a destination coupled to the service provider network; determining an operating system identifier (OS ID) associated with the TCP session and the computing device. If malware is present in the TCP session an associated malware ID is determined by comparing a malware signature to the one or more TCP packets and an alert is generated identifying a network address associated with the access device, the malware ID and the OS ID associated with TCP session that generated the alert.

BRIEF DESCRIPTION OF DRAWINGS

Further features and advantages of the present disclosure will become apparent from the following detailed description, taken in combination with the appended drawings, in which.

Various embodiments of a network based malware detection system will be described with reference to the figures in which.

DETAILED DESCRIPTION

Figure 1:
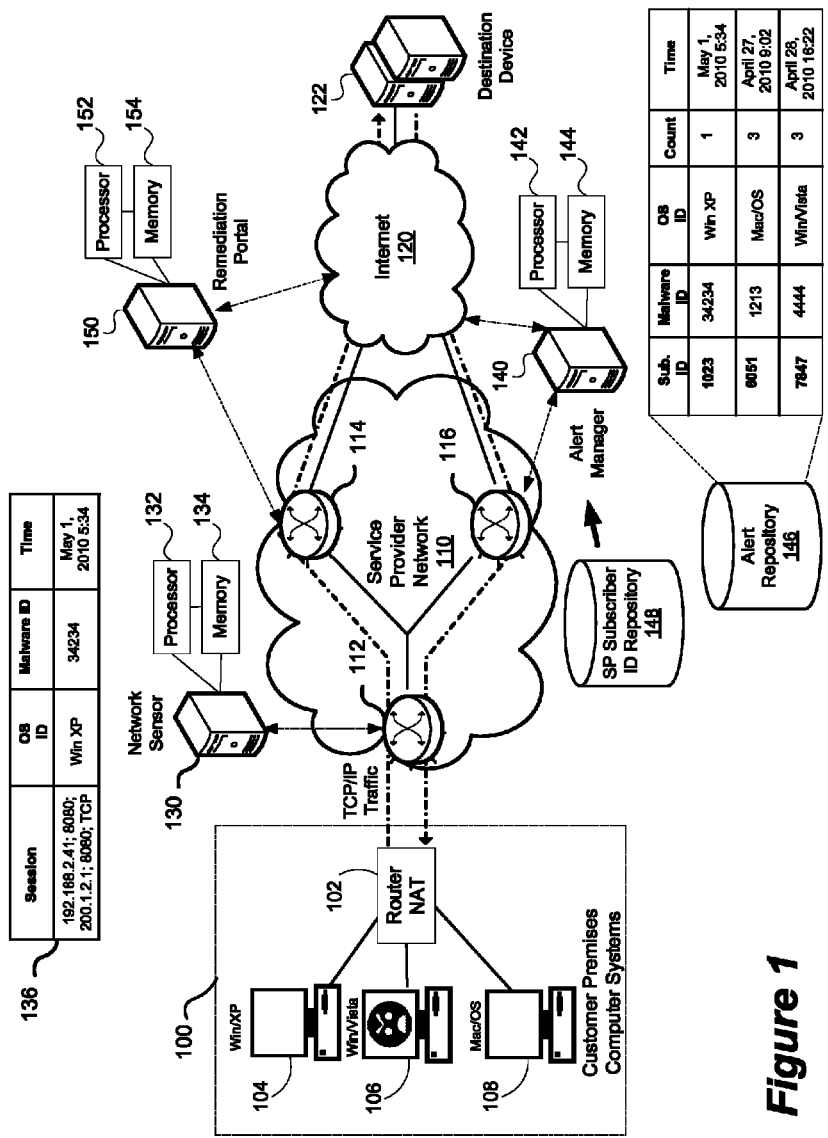
FIG. 1 depicts in a block diagram of a system for malware detection and operating system detection are utilized for providing malware remediation.

Embodiments are described below, by way of example only, with reference to FIGS. 1-8.

Residential and business networks are typically connected to the Internet using a gateway or router that uses NAT. All traffic emerging from that network share the same IP address that is assigned to the gateway or router. When NAT is utilized it is not possible for detection technologies that use the IP addresses to distinguish between individual devices that may be resident in the local network behind the NAT device. By combining TCP session tracking and OS fingerprinting a specific operating system can be associated with an individual TCP session which can improve the ability to distinguish between computing devices. In a network-based malware detection system, the ability to identify an operating system enables information to be provided to the user to speed the remediation process. A household with multiple computers, or computing devices, each potentially running different operating systems can require considerable time to remediate. The ability to provide identification of an operating system that is infected and request that the user access the remediation portal with a computer that has a particular operating system can improve the results of the remediation process.

In the present system when malware is detected in a session originating from an access device coupled to a service provider network a security alert is raised to identify the session contains an infection that should be addressed. When the infected device is a computing device that accesses the network by a NAT device, the ability to identify a specific computing device is a challenge. To enable proper identification of an associated computing device, the OS information that is determined for the session is sent with the alert. By providing OS identification the remediation process can focus on those computing devices that are infected rather than requiring remediation procedures on devices that are potentially not infected. The technique allows a distinction between the most of the popular operating systems used in computing devices such as personal computers, mobile phones, tablets and other networked devices that may be susceptible to an infection. This includes (but is not limited to): Windows 98™, Windows NT™, Windows XP™, Windows Vista™, Windows 7™, Linux, Android™, BSD, Mac OS™, iOS™, Blackberry™ OS, Sun OS™, etc.

There are a number of techniques that can be used to identify a computer's operating system based on network traffic coming from that computer. One is TCP/IP stack fingerprinting to identify candidate operating systems based on the first SYN packet of the TCP session which is available for all TCP sessions. Another technique is to extract the operating system string from the browser User-Agent field on HTTP requests. These are combined to accurately identify the operation system associated with an individual session.

When malware is detected on the user's device, an alert notification is sent to the user informing them that they should visit the remediation portal to remove the malware from their system. The remediation process involves downloading malware cleaning tools to the infected machine These tools scan the infected device and remove any malware found. These scans can take considerable time and must be run on all devices that may be infected. So, when there are multiple devices in the household, being able to identify the infected device can considerably shorten the remediation process. When the user visits the remediation portal from one of their household devices, the same OS fingerprinting techniques can be used. This enables the portal to determine if the device has the same operating system as the one identified in the alert and thus decide whether the remediation process is required for that device. If the OS of the device matches the one from the alert, the full remediation process is run. If the operating systems do not match, the user is informed that the device is clean and asked to reconnect to the portal from one of their devices that matches the OS detected with the security alert.

FIG. 1 depicts, in a block diagram, a system for operating system identification and malware remediation. A user location 100 comprises multiple computing devices 104, 106, 108 in a local area network (LAN) that access an Internet service provider or service provider (SP) network 110 via an access device 102. The access device may provide access via wired or wireless interface for a single computing device to the network or may provide network address translation (NAT) to allow multiple devices to connect to the network as shown. NAT may be provided either directly through incorporation in a router or modem or through additional hardware or software functionality provided by one of the computing devices. TCP/IP traffic is received at the network edge node 112 which routes the data through the SP network 110 to the Internet 120. Destination device 122 is accessed through the Internet 120. The destination device may be a web server, peer computer, content server or another network to which a computer 104, 106, 108 is engaged in a TCP session.

The SP network 110 comprises a plurality of routers or switches 112, 114, 116 for directing network traffic between two endpoints, such as a subscriber computer 104 and a web site provided by a web server of destination device 122 on the public Internet 120. The system of the present disclosure, or parts thereof as described further below, are deployed within the SP network in order to capture and analyze the network traffic. Using the analyzed traffic, the system can determine if a subscriber's computer 104 is infected with malware. If the system determines that a subscriber's computer 104 is infected, it can provide a notification to the subscriber that a computer running a specific operating system is infected and direct them to remedy the infection.

The system helps to ensure that computers 104 connected to the SP network are not infected with malware aiding in the safe and reliable functioning of the SP network 110. Furthermore, since the system is network based, it is not necessary to have the subscriber download, install or update software. This can help ensure that all of the components in the system are utilizing the most current malware detection means as possible.

The edge node 112 either provides or is connected to one or more network sensors 130 comprising at least a processor 132 and memory 134. The network sensor 130 either implements or is coupled to a network tap/filter that is capable of copying packets of information travelling over the SP network 110. The network sensor 130 analyzes packets from the network tap/filter to determine if the packets contain evidence of malware infection on the computers 100 from which the packets originate. In addition the sensor will also examine the packets to determine the operating system (OS) of the computer 104 from which the packets originate. When malware is identified, the network sensor sends an alert 136 to an alert manager 140 coupled to the SP network 110 either directly or indirectly The alert 136 contains the source and destination IP addresses and port numbers from the packet that generated the alert, a time stamp indicating when the alert occurred, the OS identifier of the computer that caused the alert, an identifier that indicates which specific malware was detected several parameters that indicate the type of malware, in addition it may include threat level and severity of the alert in question.

Advantageously a network sensor device 130 located near a subscriber's computers 100 at the edge of the SP network for example edge node 112 will see both upstream and downstream packets for the subscriber's NAT device 102. This allows the detection engine to track state information for a connection and use signatures based on this session state information. Although this location for the deployment of network sensor devices has advantages, it may also require a large number of network sensors to be deployed, which would increase the capital expenditure and operating expenses for deploying the system. Additionally or alternatively, network sensor devices 130 may deployed within the core of the SP network at location where each network sensor device may be able to see, and so process, more network traffic. This may reduce the capital expenditures and operating expenses for deploying the system.

The alert manager 140, comprising at least a processor 142 and memory 144, receives the alerts 136 from one or more network sensors 130. The alert manager 140 may be in the SP network 110, coupled to the SP network 110 or accessible via an intermediary network, for example the Internet 120.

The alert manager 140 stores the alerts 136 in the alert repository 146. The alert information that is stored in the database consists of a subscriber identifier that is derived from the IP address, the malware identifier, the OS identifier and the time stamp from when the alert was observed. Subsequent alerts for the same combination of subscriber, malware and OS identifies are not stored, but a counter is incremented in the alert record to track multiple occurrences of the same alert. The subscriber identifier is derived from the original alert information through an ID translator that is capable of translating a network identifier, such as an IP address, to an associated subscriber identifier, such as a user name or account number of a subscriber, a media access control (MAC) address assigned to the subscriber, network access server (NAS) port number, etc. The subscriber identifier uniquely identifies the residential user location 100 and may be retrieved or provided from a service provider subscriber ID repository 148.

The alert manager 140 may further comprise a subscriber notification generator to generate a notification to a subscriber on the first instance or once the subscriber's alerts have passed a threshold value or based upon time until the alert is cleared. The threshold value may vary depending on the configuration of the system. For example, if the detection engine in the network sensor 130 used to detect malware infection provides the malware detection with a very low false-positive rate; the threshold value may be set so that if the alert indicates that a single detailed alert has been generated for the user a corresponding notification is generated. Alternatively, if the detection engine has a higher false-positive rate the threshold may be raised in order to account for potential false positives. Additionally, the threshold may be set for the particular malware or type of malware. For example, the threshold may be set to generate a notification if a single alert was generated for a particular piece of malware that is considered to be a significant threat, and also generate a notification if, for example, ten alerts have been generated for a particular piece of malware that is considered to be a medium threat.

The notification provided to the subscriber may be provided in various ways. For example, the notification may be an email sent to the subscriber, a text message sent to a phone number associated with the subscriber ID, a voicemail sent to a phone number associated with subscriber ID or as a domain name server (DNS) redirect for future traffic of the subscriber, or as a walled garden or web interstitial.

The notifications sent to a subscriber include directions for accessing a remediation portal 150, comprising at least a processor 152 and memory 154. For example, if the notification is an email, the indication may include a hypertext link, if the notification is a voicemail it may include instructions for accessing the remediation portal. If the notification is a DNS redirect, the indication may be a landing page of the remediation portal 150. The notification identifies the operating system that the malware was detected on and requests that the user access the remediation portal 150 with the computer that may contain the infection.

The remediation portal 150 determines the subscriber connecting to the portal and the operating system associated with the connection. The remediation portal 150 may be in the SP network 110, coupled to the SP network 110 or accessible via an intermediary network, for example the Internet 120. Similar detection techniques may be utilized as in the network sensor 130 at the portal to determine an operating system associated with the computer accessing the portal. The remediation portal 150 can then provide the subscriber with instructions to follow in order to remove or quarantine the particular malware detected if the OS matches the OS identified in the alert information 136. The remediation portal may provide a dynamically generated instructions based on the specific malware that was detected on the subscriber's computer. The remediation process provided by the portal may include automated processes for automatically removing the malware from the computer. Additionally, or alternatively, the remediation process may comprise instructions for actions to be performed by the subscriber such as deleting a file, modifying configuration settings of the computer, etc. If the OS of the computer does not match the alert summary information the user may be requested to access with another computer have the identified operating system until an appropriate OS and malware are identified.

Once the user has accessed the remediation portal 150, and completed the remediation process, the remediation portal resets the alerts stored in the alert repository 146 for the subscriber associated with the remedied malware. As such, once the subscriber has performed the remediation process, no further notifications will be received, unless a further malware infection is detected. Alternatively, the malware identification may be maintained for tracking and trending purposes. It should be noted that the remediation portal 150 and the alert manager 140 are described as separate entities, however functionality may reside or be shared in a single system. Similarly the summary alert repository 146 may maintained at one or both locations.

Figure 2:
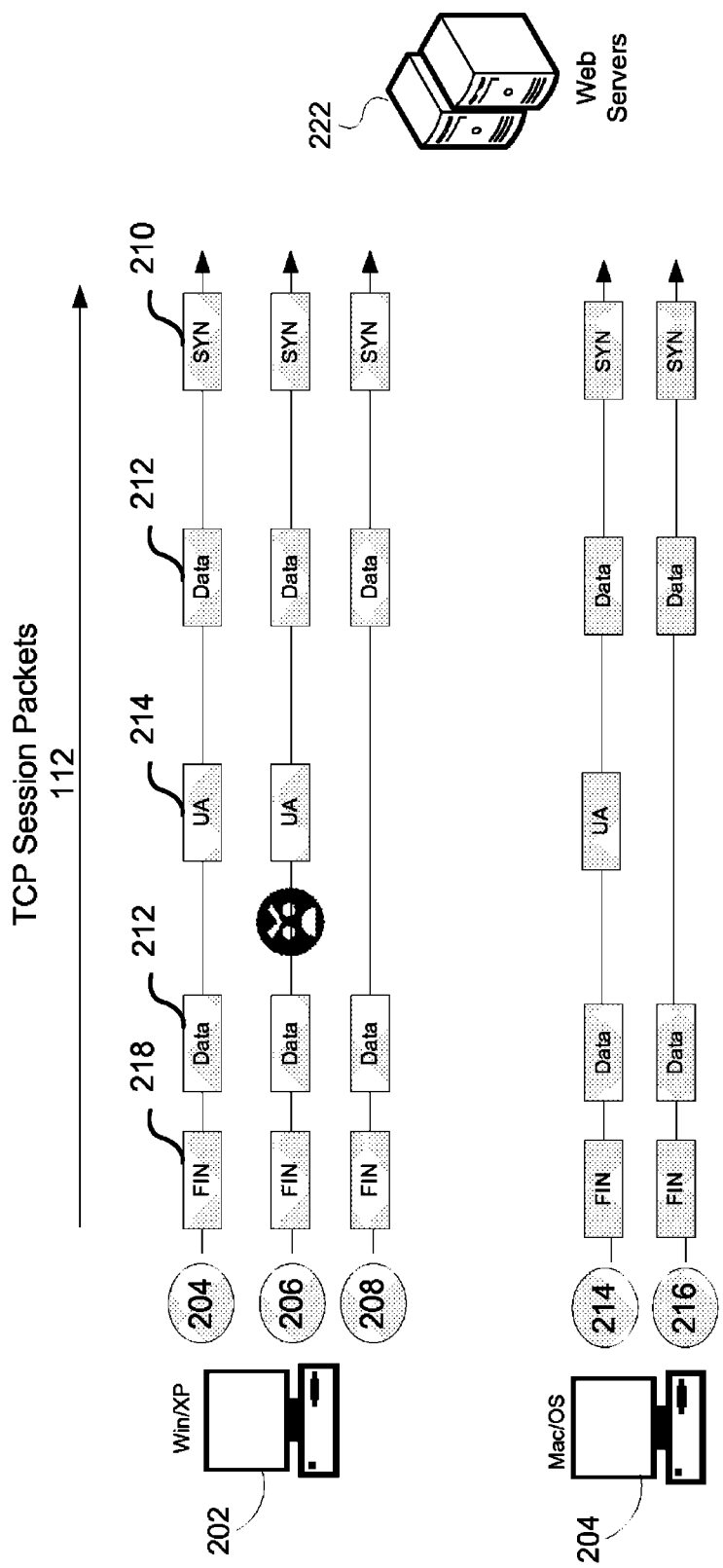
FIG. 2 depicts an illustrative TCP session analysis.

FIG. 2 depicts an illustrative TCP session analysis between computer 202 and 204 of different operating systems and web servers 222. For each session 204, 206, 208, 214 and 216 the following information is extracted from the SYN packet 210.

Initial packet size (16 bits)
Initial TTL (8 bits)
Window size (16 bits)
Max segment size (16 bits)
Window scaling value (8 bits)
"don't fragment" flag (1 bit)
"sackOK" flag (1 bit)
"nop" flag (1 bit)

These fields are set by the operating system in an attempt to optimize the TCP protocol. Different operating systems will choose different combinations and its these different combinations that enable fingerprinting to identify the OS. Some of the fields are optional (scaling, sackOK, nop, etc) and can appears in different orders and combinations. This information is also used to determine an associated operating system.

The correlation can occur by comparing the SYN fingerprint to a set of known SYN fingerprints. The SYN fingerprints can be correlated by data collection and comparison to the previous SYN fingerprints to associate and OS identifier with the SYN packet.

The user agent (UA) 214 field is extracted from TCP packets in the HTTP protocol to identify the application type, operating system, software vendor, or software version being utilized by the computer 202 and 204 and provide an additional level of OS fingerprint confidence or possibly identify a discrepancy between the SYN packet analysis and UA field.

The data packets 212 are analyzed against malware signatures to determine the presence of possible malware. When malware is detected in the session information data packets 212, the session is flagged, for example session 206. In this example the SYN and UA fields would identify that a Windows/XP computer is infected. Sessions 204, 206 and 208 would all be identified as Windows/XP sessions. Similarly session 214 and 216 would be identified as Mac OS sessions. The Windows/XP sessions 204, 206 and 208 may all be from the same computer or from different computers if more than one computer in the residence is running Windows/XP. The FIN packet 218 may be utilized to define the termination of a TCP session.

Figure 3:
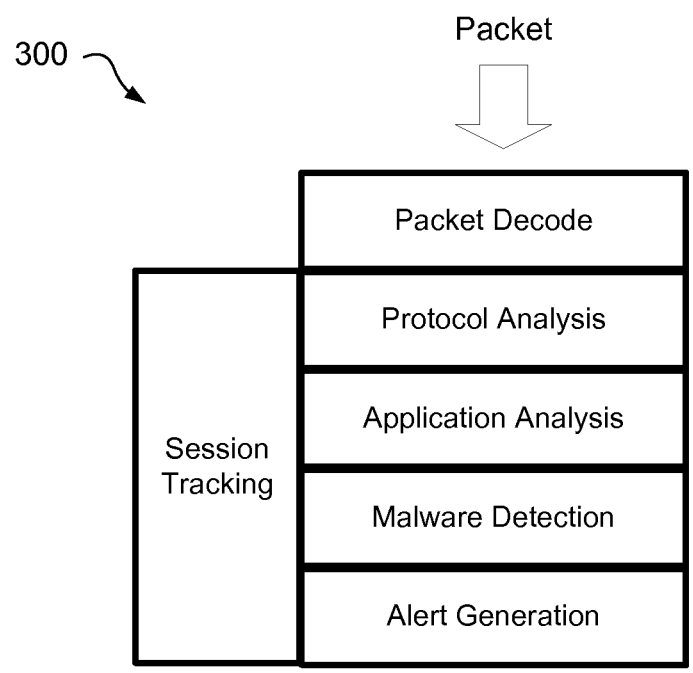
FIG. 3 depicts a representation of session tracking and analysis.

FIG. 3 depicts a representation 300 of session tracking and analysis performed at the network sensor 130. A session tracking engine receives packets at network sensor 130 that are decoded. Protocol analysis may also include determining the type of packet, for example TCP or UDP. From the protocol, protocol parameters are utilized, such TCP parameters in a SYN packet or associated with a SYN flag, to provide an OS signature. Application analysis is then performed to further identify the OS. The application analysis can be used to verify the protocol, for example HTTP protocol, and verify the user agent information available in a HTTP session.

The data of the packets are then analyzed for malware by comparing the data of the session to malware signatures. The signatures used by the malware detection may be stored in a repository, such as a local database. The signatures specify the characteristics that the malware network traffic will have. This includes data patterns that may be present in network packets, state information associated with the network protocols, and sequences of events that may be considered anomalous network behaviour. These signatures are expressed as detection engine rules. When the malware detection process detects a packet or sequence of packets that matches a specific rule it generates an alert event. The detection engine rule includes a signature for detecting malware in the network traffic as well as an action to take when the rule is matched. The appropriate alert can then be generated. The alert combines malware information from the malware detection stage with operating system information from the protocol and application analysis phases.

Figure 4:
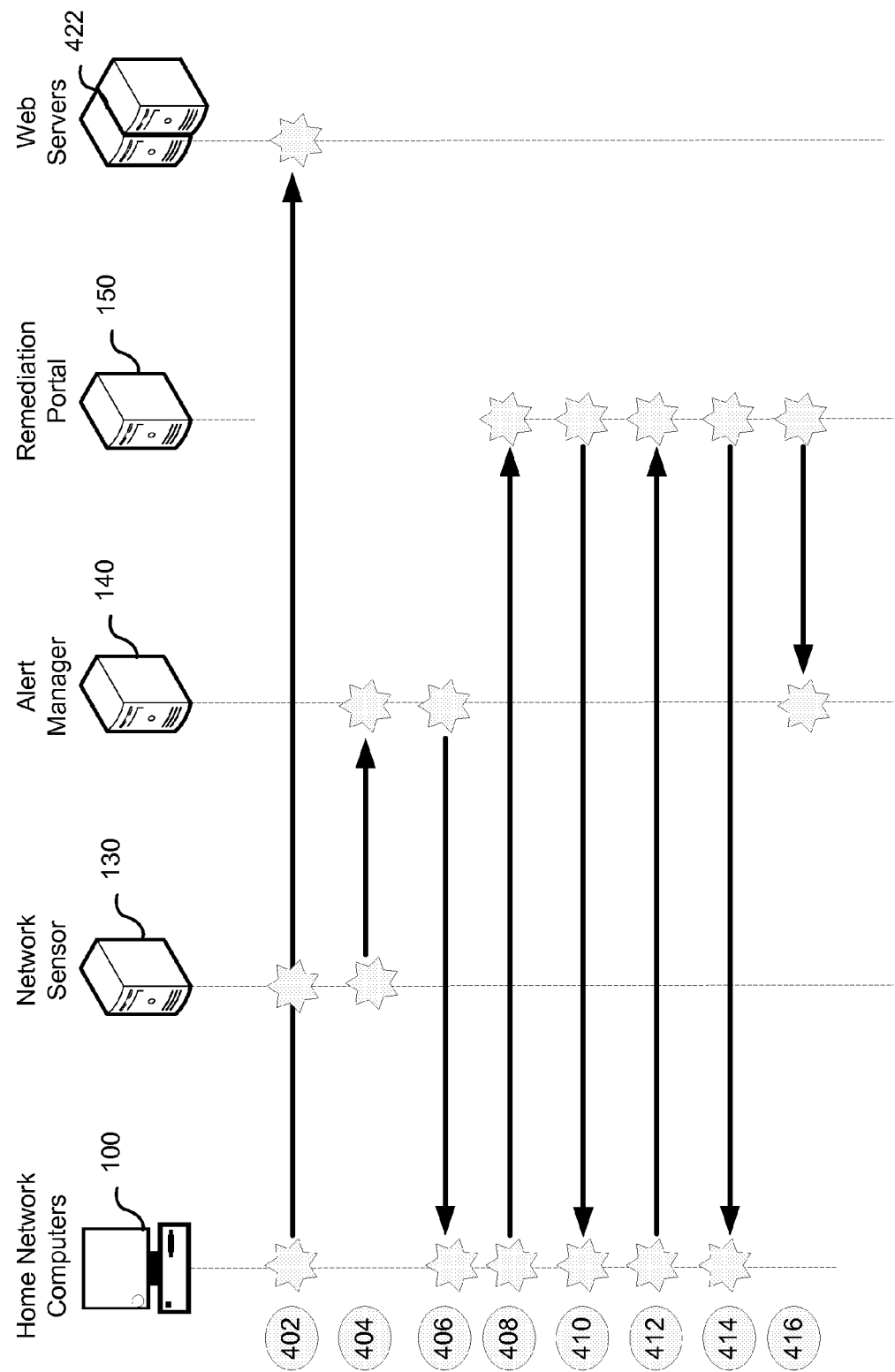
FIG. 4 depicts a data flow diagram for operating system identification, malware detection and remediation.

FIG. 4 depicts a data flow diagram for operating system identification and remediation. In this example a user location 100 having one or more computer behind a NAT device initiates a session with web server 422. Packets from the session are monitored by the network sensor 130 (402). The network sensor 130 determines the OS of computing device such as a personal computer at the user location and identifies the presence of an infection such as malware. An alert is generated by the network sensor 130 and sent to the alert manager 140 identifying the IP or network address, the OS of the infected device, malware that caused the infection and a timestamp (404). On the first occurrence of the alert, the alert manager 140 sends a message to the subscriber associated with the session identifying the presence of a computer with malware infection and the OS (406). The user receives the message and is directed to access a remediation portal 150. Upon user access the remediation portal retrieves the alert information from the alert manager database In this example it is assumed that the user accessed the remediation portal 150 from a computer with an OS that did not match the alert (408). The user is informed of this OS/Alert mismatch and asked to connect to the remediation portal from a computer whose OS does match the alert (410). A subsequent access is then performed, and the appropriate OS and malware are identified on the computer (412). A remediation process is commenced by the portal 150 to remove the malware infection (414) and the user is notified of success remediation. The remediation portal 150 can then notify the alert manager 140 of the success removal of the malware and remove the associated alert (416).

Figure 5:
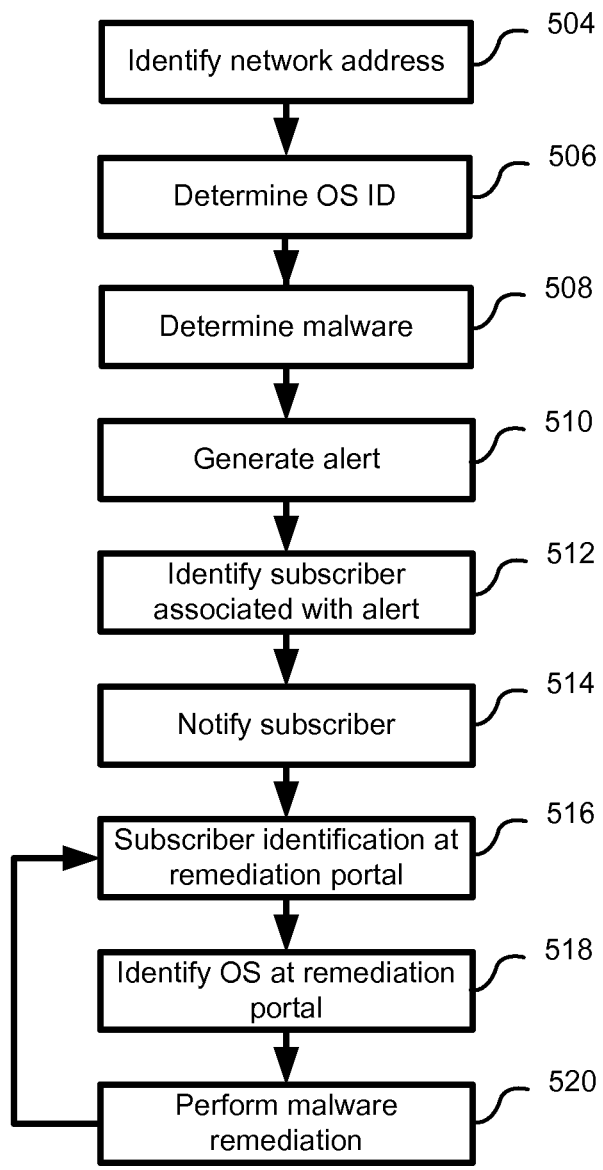
FIG. 5 depicts a method of operating system detection and malware identification and remediation.

FIG. 5 depicts a system level method of operating system detection and malware identification and remediation. As will be further described in FIG. 6, from TCP packets received at one or more network sensors, an IP address of the access device is determined (504). If the IP address is not identified for monitoring, the packets may be discarded. An OS ID associated with the TCP packets is determined by one or more methods determining identifiable OS characteristics (506) and further described in FIG. 6. The session is analysed by malware detection engine to determine if an infection is present in the session (508). An alert is then generated (510) to identify the IP address, the infection and an associated operating system. As will be further described in FIG. 7, the alert is forwarded to an alert manager where the IP address is converted to a subscriber identifier (512). The user associated with the IP address, or user location, is then notified (514) that a computing device associated with the access point, for example behind a NAT device, is infected and identification of the operating system is provided. As will be further described in FIG. 8, the user then visits the remediation portal (516) which identifies the operating system of their computing device using the same techniques as the sensor (518). If the operating system of the connected computing device matches the alert then the remediation process is executed from the portal (520). This involves scanning the infected computing device and removing the infection such as malware. If the operating system of the connected computing device does not match the alert, the user is asked to connect to the portal from the next computer. This is repeated until all computing devices associated with the access device have been cleaned.

Figure 6:
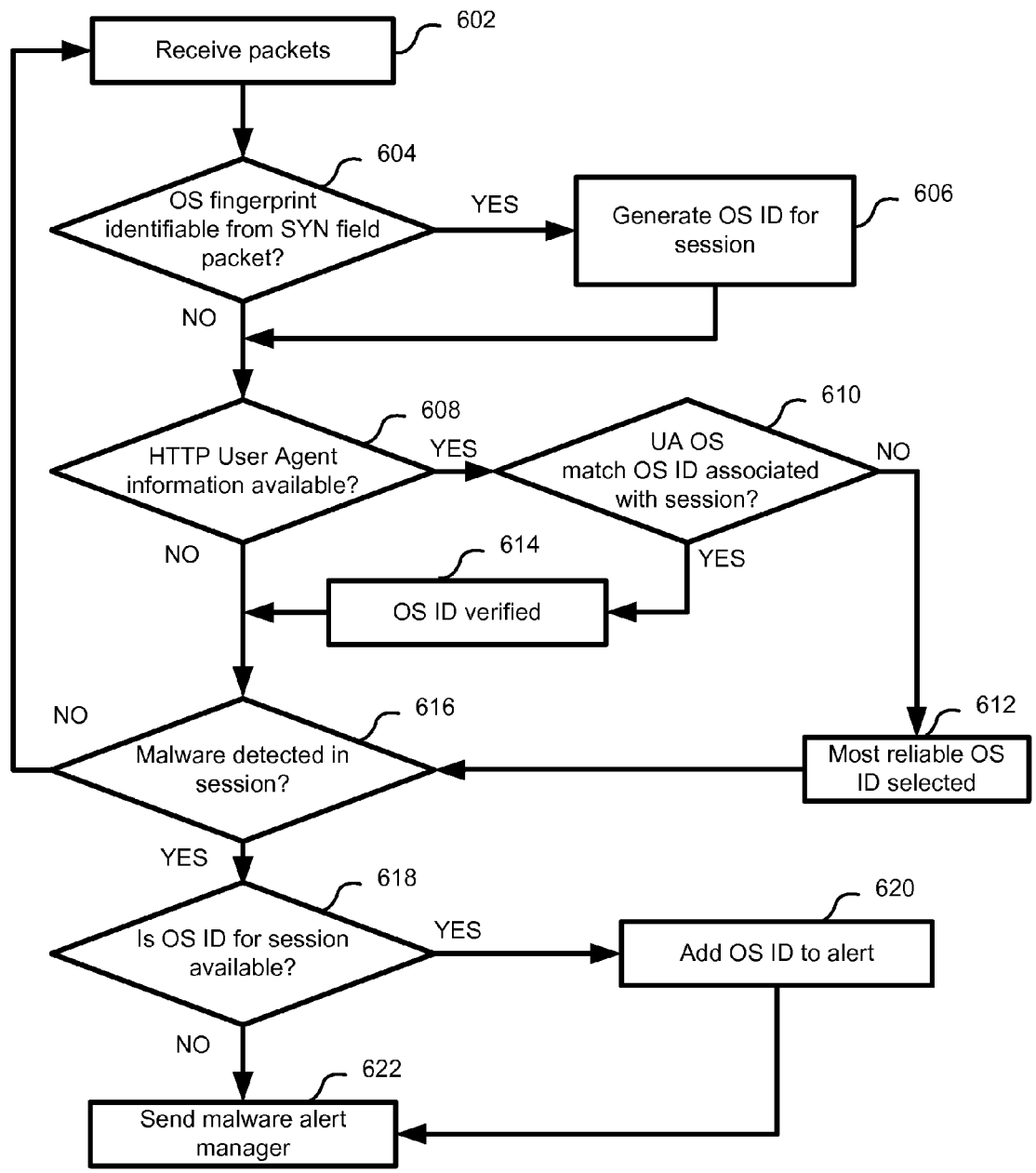
FIG. 6 depicts a method of operating system detection and malware identification.

FIG. 6 depicts a method of operating system detection and malware identification. The method begins with receiving packets (602) that have been captured from the SP network traffic. The packets are analyzed to determine an OS fingerprint by comparing the SYN packet for the session with known SYN fingerprints. If an OS ID is identified, (YES at 604) and OS identifier is generated (606). If an OS fingerprint is not identified (NO at 604), the packets are passed to the application protocol analysis module. If the HTTP UA information is not present, (NO at 608) malware analysis is performed (616). If the protocol is HTTP and a UA field is present (YES at 608), the OS specified in the UA field is compared with the OS identifier from the SYN packet. If they match (YES at 610) the OS identifier is verified (614). On a mismatch (NO at 610) the most reliable one is chosen (612). When the OS identifier is verified the UA information may be utilized to refine the OS identified by the SYN parameters. For example the SYN parameters may identify that the computing device is a Windows 7 computer where the UA may be able to refine the information and identify that it is a Windows 7 SP1 computer.

All packets are then passed to the malware analysis module for processing (616). Malware detection is performed by comparing each of the received packets to a detection rule, or a signature of the detection rule, for a particular piece of malware. If malware is not detected (NO at 616) packet processing continues for that session. If malware is detected based upon fingerprint analysis (YES at 616) and OS information is available (YES at 618), it is added to an alert event (620) and sent to an alert manager (622). If an OS is not identified (NO at 618) an alert is generated (622) without OS identification. The alert contains the source and destination IP addresses and port numbers from the packet that generated the alert, a time stamp indicating when the alert occurred, the OS identifier of the computing device that caused the alert, an identifier (signature id) that indicates which specific malware was detected several parameters that indicate the type of malware, threat level and severity of the alert in question.

Figure 7:
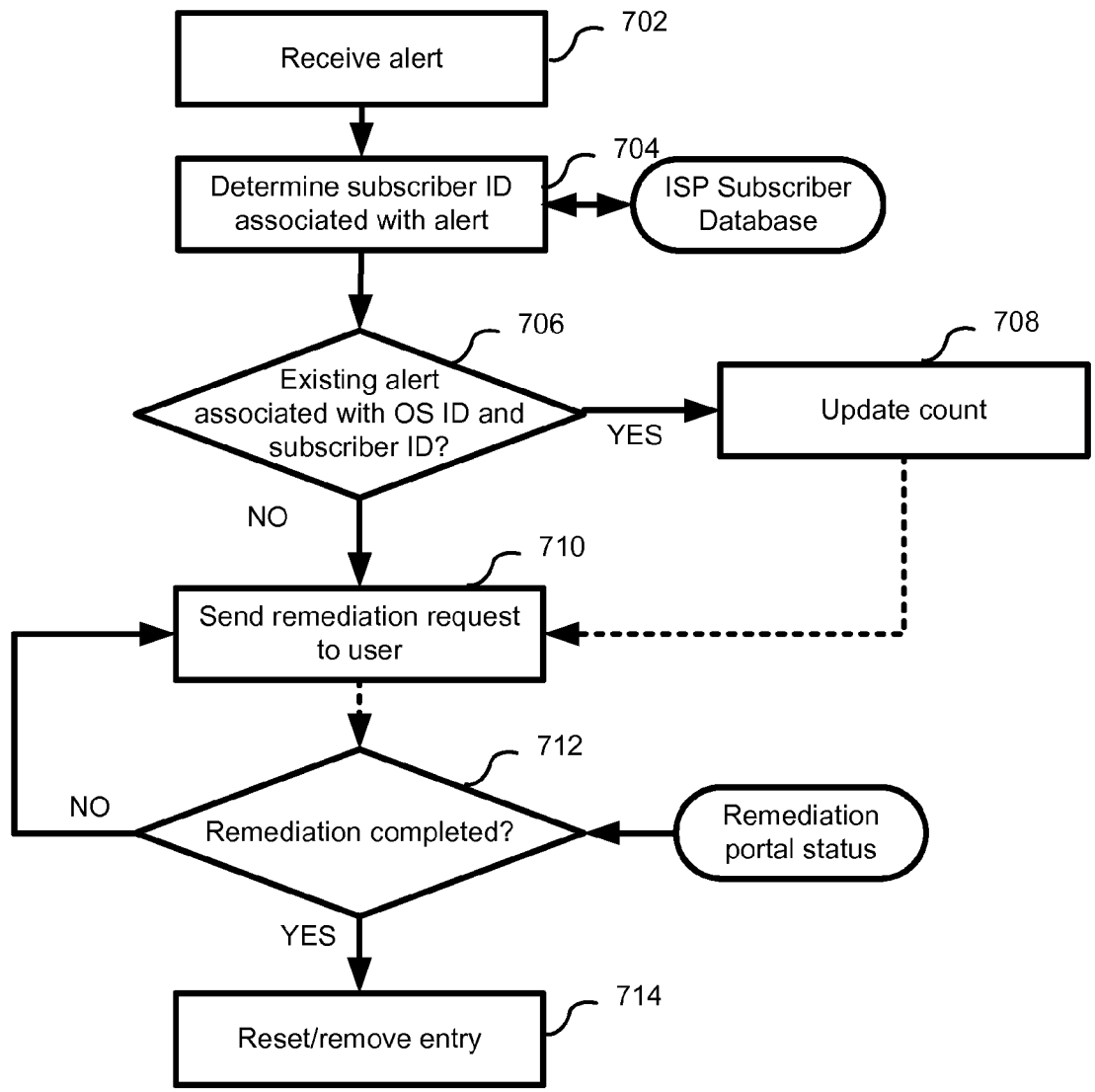
FIG. 7 depicts a method of malware alert management.

FIG. 7 depicts a method of malware alert management for notifying subscribers of a malware infection. The method begins with receiving alert events from one or more network sensors 130 at an alert manager 140 (702). The network identifier (for example source IP address) associated with the alert event is translated into a subscriber identifier (704). The subscriber identifier is derived from the original alert information through an ID translator that is capable of translating a network identifier, such as an IP address, to an associated subscriber identifier, such as a user name or account number of a subscriber, a media access control (MAC) address assigned to the subscriber, network access server (NAS) port number, etc.

The alerts are identified by three pieces of information: the subscriber ID, the malware ID and the OS ID. The system determines if and an alert already exists in the system with the same subscriber ID, malware ID and OS ID combination (YES at 706). If so a counter is incremented for this alert (708). If not, (NO at 706) it is treated as a new alert and a notification is sent to the subscriber (710). The user will then visit the portal to begin the remediation process. The end result of this process will be to reset the user's status for this alert to "remediation complete".

Periodically, the alert/notification process will check to ensure that the remediation status for each alert has been completed. If the remediation is completed (YES at 712), by receiving an indication from the remediation portal, the alert manager removes the alert event, or reset the counter (714) for the subscriber and OS. If the remediation is not completed (NO at 712), based upon a notification from the remediation portal, or a time interval, or counter threshold, another request may be sent (710) to the subscriber.

Figure 8:
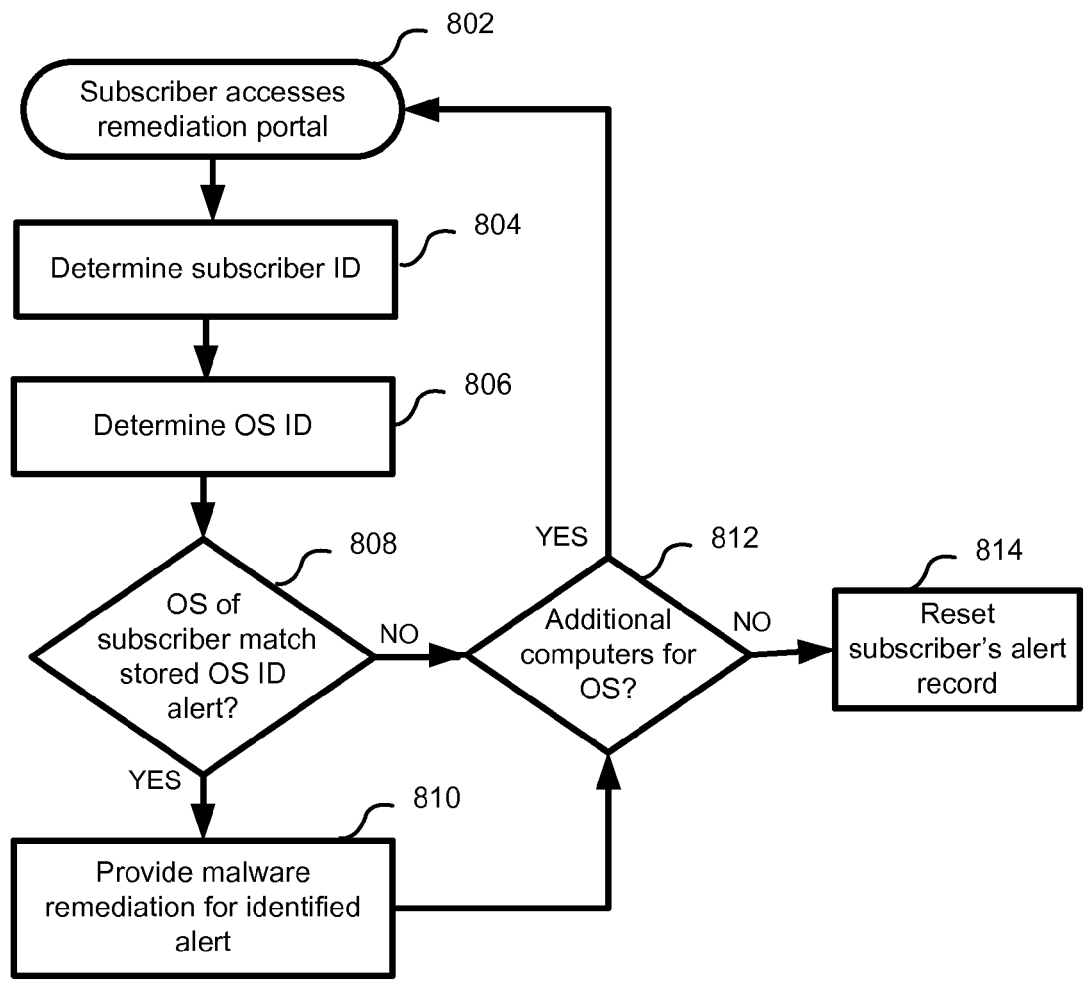
FIG. 8 depicts a method of malware remediation.

FIG. 8 depicts a method of malware remediation for remediating a malware infection on a computing device coupled to a service provider network. The method begins with a subscriber receiving a notification, which includes an indication for accessing a remediation portal, from the reporting infrastructure. The subscriber may then access the remediation portal (802). The subscriber ID is determined based upon the originating address or by a login user ID and password that is associated with their subscriber ID (804). The session with the computing device is analyzed to determined the OS and may be performed using SYN and UA techniques as previously described (806). If the OS ID in the alert event match the OS in the current session (YES at 808) the remediation portal provides the subscriber with a remediation process (810). If the OS in the alert event does not match the OS in the current session (NO at 808) the user can indicate if additional computing devices are associated with the NAT device at the user location. If additional computing devices are present (YES at 812) the process is repeated (802) by the user accessing the portal using each of the associate computing devices until the process is complete. If not additional computing device are present (NO at 812) the subscriber's alert record can be reset (814).

Although the above description has described various embodiments of a network based malware detection system, one skilled in the art will appreciate that changes and modifications may be made to the described illustrative embodiments. The above description provides a network based operating system and malware detection system and method. The components of the system, as well as their functioning have been described using various means, including flow charts specifying methods that the components of the system may implement. It is understood that the system may comprise hardware components that can be incorporated into a communication network. The hardware components may combine hardware, firmware and software in order to implement the system described herein. Alternatively, the system components may be implemented on hardware components by software expressed as a series of computer executable instructions that configure the hardware components to implement the system described herein.

What is claimed is:

1. A method of network based malware detection in a service provider network, the method comprising:
   receiving one or more transmission control protocol (TCP) packets originating from an access device coupled to the service provider network, the one or more TCP packets defining a TCP session between a computing device coupled to the access device, and a destination coupled to the service provider network;
   determining an operating system identifier (OS ID) associated with the TCP session and the computing device;
   determining if malware is present in the TCP session and an associated malware ID by comparing a malware signature to the one or more TCP packets; and
   generating an alert identifying a network address associated with the access device, the malware ID and the OS ID associated with TCP session that generated the alert.

2. The method of claim 1 wherein determining the operating system ID further comprises:
   determining a protocol associated with the TCP packets and matching an OS fingerprint from one or more protocol parameters if present in the TCP packets to determine a first operating system identifier (ID);
   determining an application parameter associated with the TCP session if present, and identifying a second OS ID from the application parameter; and
   wherein the OS ID in the alert comprises one of the first OS ID or second OS ID associated with one or more computing devices coupled to the access device.

3. The method of claim 2 further comprising sending a notification to a subscriber associated with the network address associated with the access device, the notification identifying a remediation portal to remove the determined malware in the alert.

4. The method of claim 3 further comprising:
   identifying at the remediation portal the subscriber accessing the remediation portal;
   identifying the OS associated with the computing device used by the subscriber to access the remediation portal;

comparing the OS associated with the computing device to the at least one of the first OS ID or second OS ID identified in the alert; and providing malware remediation to the computing device when the at least one of the first OS ID or second OS ID matches the OS associated with the computing device.

5. The method of claim 3 wherein if the OS of the computing device is not the at least one of the first OS ID or second OS ID identified in the alert an indication is provided to the subscriber to connect to the remediation portal with an other computing device connected to the access device.

6. The method of claim 3 wherein the alert is cleared when all computing devices associated with the access device and the computing device having the at least one of the first OS ID or second OS ID have accessed the remediation portal.

7. The method of claim 2 wherein determining the first OS ID is performed by comparing one or more protocol parameters of the one or more TCP packets having a SYN flag associated with the session, wherein the OS fingerprints identify the protocol parameters of the SYN flagged packet and the OS ID associated with parameters.

8. The method of claim 2 wherein determining the application parameter associated with the session and identifying the second OS ID from the application parameter by inspecting an HTTP user agent string to determine the second OS ID.

9. The method of claim 2 further comprising verifying the first OS ID against the second OS ID, wherein if the second OS ID does not match the first OS ID the session is identified by the OS ID identified as a more reliable OS ID.

10. The method of claim 2 further comprising verifying the first OS ID against the second OS ID, wherein if the second OS ID matches the first OS ID either OS ID is used.

11. The method of claim 2 further comprising verifying the first OS ID against the second OS ID, wherein if the second OS ID matches the first OS ID but the second OS ID provides additional information, the second OS ID is used.

12. The method of claim 3 wherein sending the notification to the subscriber associated with the access device further comprises replacing the network address of the access device with a subscriber ID.

13. The method of claim 12 wherein sending the notification to the subscriber associated with the access device further comprises aggregating one or more detailed alerts having the subscriber ID into a single alert summary associated with the subscriber ID.

14. The method of claim 12 wherein the one or more computing devices are coupled to the access device through a local area network (LAN), the access device providing network address translation (NAT) or is coupled to NAT device to share the network address of the access device.

15. A system for network based malware detection in a service provider network, the system comprising:

a plurality of network sensors coupled to the service provider network, each of the network sensors for:
receiving one or more transmission control protocol (TCP) packets originating from an access device coupled to the service provider network, the one or more TCP packets defining a TCP session between a computing device coupled to the access device, and a destination coupled to the service provider network;
determining an operating system identifier (OS ID) associated with the TCP session and the computing device associated;
determining if malware is present in the TCP session and an associated malware ID by comparing a malware signature to the one or more TCP packets; and
generating an alert identifying a network address associated with the access device, the malware ID and the OS ID associated with TCP session that generated the alert.

16. The system of claim 15 wherein the plurality of network sensors in determining the OS ID further:
determine a protocol associated with the TCP packets and matching an OS fingerprint from one or more protocol parameters if present in the TCP packets to determine a first OS ID;
determine an application parameter associated with the TCP session if present, and identifying a second OS ID from the application parameter; and
wherein the identified OS ID in the alert comprises one of the first OS ID or the second OS ID associated with one or more computing devices coupled to the access device.

17. The system of claim 15 wherein the plurality of network sensors further: send a notification to a subscriber associated with the network address associated with the access device, the notification identifying a remediation portal to remove the determined malware in the alert.

18. The system of claim 17 wherein the plurality of network sensors send the notification to the subscriber associated with the access device by retrieving a subscriber ID from a subscriber ID repository and replacing the network address of the access device with the subscriber ID.

19. The system of claim 16 wherein the plurality of network sensors determine the first OS ID by comparing one or more protocol parameters of the one or more TCP packets having a SYN flag associated with the session, the OS fingerprints identify the protocol parameters of the SYN flagged packet and the OS ID associated with parameters.

20. The system of claim 19 wherein the plurality of network sensors determine the application parameter associated with the session and identifies the second OS ID from the application parameter by inspecting an HTTP user agent string to determine the second OS ID.

21. The system of claim 20 wherein the plurality of network sensors verify the first OS ID against the second OS ID, wherein if the second OS ID does not match the first OS ID the session is identified by the OS ID providing a more reliable OS ID.

22. The system of claim 20 wherein the plurality of network sensors verify the first OS ID against the second OS ID, wherein if the second OS ID matches the first OS ID either OS ID is used.

23. The system of claim 20 wherein the plurality of network sensors verify the first OS ID against the second OS ID, wherein if the second OS ID matches the first OS ID but the second OS ID provides additional information, the second OS ID is used.

24. A computer readable memory containing instructions for network based malware detection in a service provider network, the instructions when executed by a processor performing:
receiving one or more transmission control protocol (TCP) packets originating from an access device coupled to the service provider network, the one or more TCP packets defining a TCP session between a computing device coupled to the access device, and a destination coupled to the service provider network;
determining an operating system identifier (OS ID) associated with the TCP session and the computing device;
determining if malware is present in the TCP session and an associated malware ID by comparing a malware signature to the one or more TCP packets; and generating an alert identifying a network address associated with the access device, the malware ID and the OS ID associated with TCP session that generated the alert.

25. The system of claim 16 further comprising:
a remediation portal coupled to the service provider network, the remediation portal for:
  identifying a subscriber accessing the remediation portal;
  identifying the OS associated with the computing device used by the subscriber to access the remediation portal;
  comparing the OS associated with the computing device to the OS ID identified in the alert; and
  providing malware remediation to the computing device.

* * * * *